Feb. 9, 1943. A. S. VOLPIN 2,310,480
LUBRICATION FEED FOR VALVES
Filed Feb. 17, 1941
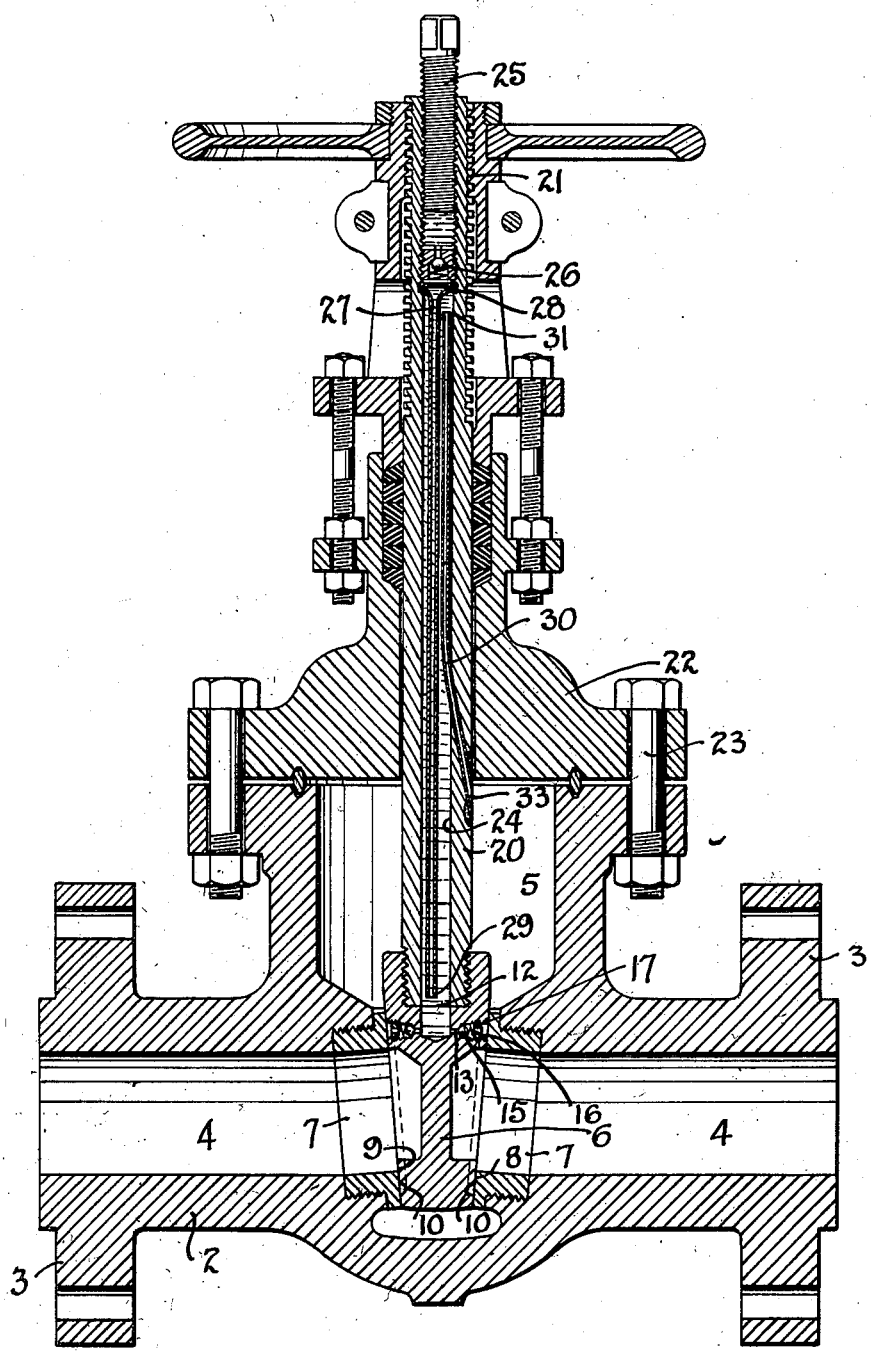
A.S. VOLPIN
INVENTOR.
BY Lester B. Clark.
ATTORNEY.

Patented Feb. 9, 1943

2,310,480

UNITED STATES PATENT OFFICE 2,310,480

LUBRICATION FEED FOR VALVES

Alexander S. Volpin, Houston, Tex., assignor to Mission Manufacturing Company, Houston, Tex.

Application February 17, 1941, Serial No. 379,247

1 Claim. (Cl. 251—20)

The present invention relates to a lubrication feed for valves.

It is to be understood that the present invention may be applied to gate or plug valves, or to any other type of valve where a lubricant or similar material is utilized in maintaining a seal.

In many types of lubricated valves the supply of lubricant is insufficient and is not maintained under pressure at all times so as to feed it into the sealing faces.

The present invention contemplates that the pressure in the line in which the valve is inserted will be applied to the lubricant to maintain it under pressure at the sealing faces.

Where pressure fluid is utilized in advancing the lubricant it is desirable to flush out the reservoir upon refilling so as to discharge this pressure fluid, and the present invention contemplates that the lubricant will be introduced at the base of the reservoir so as to reverse the direction of the movement of the lubricant remaining in the reservoir and discharge the pressure fluid from the reservoir as it fills with lubricant.

It is one of the objects of the invention to introduce pressure fluid into a lubricant reservoir at the top of the reservoir so as to move the lubricant into sealing position.

Still another object of the invention is to provide inverted conduits in a lubricant reservoir for valves so as to cause an inverted flow of the lubricant in filling and an inverted flow of the pressure fluid in feeding the lubricant from the reservoir.

Another object of the invention is to provide a feeding tube for lubricated valve reservoirs so as to introduce the lubricant into the bottom of the reservoir.

Another object of the invention is to provide a pressure fluid entry tube for lubricated reservoirs so as to conduct the pressure fluid into the top of the supply of lubricant in the reservoir.

A still further object of the invention is to provide a lubricated valve construction wherein the lubricant is discharged to the sealing faces and any back flow thereof into the reservoir is controlled by a check valve.

Still another and further object of the invention is to provide a single injection of lubricant to discharge to both the upstream and the downstream sides of a valve member.

Other and further objects of the invention will be readily apparent when considered with the following description in connection with the accompanying drawing wherein:

The figure of the drawing is a vertical sectional view.

In the drawing the valve housing is indicated generally at 2 and may have flanges or other connections 3 thereon but it is affixed in a line where the pressure is to be controlled. The line pressure will flow through the passage 4 in the housing and this passage is intercepted by a chamber 5 which is arranged to receive the valve member 6 which, in the present illustration, is a gate member of the rising stem type. It is to be understood, however, that the invention may be applied to any desired type of valve.

In the present construction a removable valve ring 7 is positioned at each side of the chamber 5 to form a sealing face 8 on each side of the valve member. The valve member, in turn, has an annular face 9 which is arranged to seal with the ring seats 7.

This gate member has an annular groove 10 on each side of its face which is arranged to engage the seal rings or seats 7 when the valve is in closed position. This groove 10 is arranged to receive a supply of lubricant or other suitable sealing material from the reservoir 12. A small opening 13 leads from the base of the reservoir into the groove 10 and this opening is controlled by a check valve 15 normally held in place by a spring 16 which is in turn retained in position by an adjustable retainer ring 17. One of these check valves is placed in each of the passages 13 so that there may be a flow of lubricant from the reservoir 12 into the groove. But if for some reason the pressure is reduced in the reservoir there can be no reverse flow from the line passage 4 into the reservoir.

The reservoir 12, while having its base formed in the top of the gate member 6, is primarily located in the valve stem 20. This stem is of the rising stem type in that it is threaded into the sleeve 21 carried by the bonnet 22 which is held in place on the top of the valve member by the bolts 23. This valve stem 20 has an axial recess or chamber 24 which serves as the reservoir. The lubricant or other material can be introduced at the top of this bore and may be forced inwardly by means of the rotatable screw 25. A check valve 26 prevents the return flow of the lubricant.

It seems obvious that the lubricant is to move downwardly into the reservoir 12 to discharge from the openings 13. The present invention, however, contemplates the use of a feeder tube 27 which is anchored on the inside of the valve stem 28 so that it is in suspended position with its lower end 29 spaced slightly from the bottom of the reservoir 12.

This tube is intended to receive the lubricant forced into the reservoir by the screw 25 so that the lubricant will move downwardly in this tube to the bottom of the reservoir and then reverse its path of movement to move upwardly until the reservoir is filled.

This manner of filling the reservoir from the base flushes out any foreign material which might have accumulated in the reservoir and insures that any air or other material in the reservoir will be discharged because it is carried upwardly by the flow of lubricant or other material.

In order to feed the lubricant into the sealing faces by utilizing the pressure from the line 4 as a motivating force, a pressure tube 30 has been shown as disposed within the reservoir 12 and having its upper end 31 terminating closely adjacent the upper end of the tube 27 and near the top of the reservoir 12. The lower end of this tube 30 extends through the wall of the valve stem 20 and has an entry opening 33 in the upper portion of the chamber 5. With this construction, any leakage of pressure from the line 4 will, of course, accumulate in the chamber 5 and this pressure will readily flow through the tube 30 into the top of the reservoir 12. This pressure will be available on the supply of lubricant in the reservoir and will force such lubricant against the downstream side of the valve. The check valve 15 in the high pressure side will remain closed because the pressures are balanced and the spring 16 will thus hold the check valve closed so that the flow of lubricant will be to the downstream or low pressure side.

If there is no leakage from the line 4 into the top of the chamber 5, then, of course, no lubricant or sealing material is required and none will be fed into the grooves 10.

On the other hand, should a leak occur, the pressure leaking by the upstream or high pressure sealing face will accumulate in the chamber 5, be available through the tube 30 on the top of the lubricant, and in this manner cause the lubricant to be fed into the grooves 10 on the low pressure side. This, in turn, will prevent the pressure in the chamber 5 from escaping to the down stream so that an automatic leak preventer is thus provided. Should the leak persist, however, there will be a continuous application of the lubricant under pressure to the downstream groove 10.

The pressure fluid and any foreign matter which may have passed through the tube 30 into the reservoir 12 will be flushed from the reservoir upon refilling of the reservoir with lubricant.

Broadly, the invention contemplates a simple and economical mechanism for automatically feeding lubricant to the sealing faces and for flushing out the lubricant reservoirs upon refilling.

What is claimed is:

A gate valve including a housing, a passage therethrough, a gate member to close said passage, a rising stem to operate said gate, seats in said housing about said passage to receive complementary faces on said gate member, a groove for sealing material in each of the faces, a reservoir for such material in said stem, means to introduce the material into said reservoir, an opening from said reservoir to each of said grooves, and means to utilize the line pressure leaking past one of said grooves to force material from said reservoir to said groove at the other seat including inverted piping in the reservoir to conduct introduced material to the base of the reservoir to flush out the pressure fluid, and to introduce the pressure fluid to the top of the reservoir to discharge the material from the bottom.

ALEXANDER S. VOLPIN.